United States Patent [19]

Bennett et al.

[11] 4,170,248
[45] Oct. 9, 1979

[54] METHOD FOR REPAIRING SEWER PIPES

[75] Inventors: Robert B. Bennett; Warren C. McMordie, Jr.; William H. Taylor, all of Houston, Tex.

[73] Assignee: Oil Base, Inc., Houston, Tex.

[21] Appl. No.: 655,623

[22] Filed: Feb. 5, 1976

[51] Int. Cl.² ............................................. F16L 55/18
[52] U.S. Cl. ...................................................... 138/97
[58] Field of Search ........................... 138/99, 97, 98; 61/72.7, 72.2, 72.1, 16; 264/31, 35

[56] References Cited

U.S. PATENT DOCUMENTS

| | | | |
|---|---|---|---|
| 3,163,181 | 12/1964 | Xenis et al. | 138/97 |
| 3,211,573 | 10/1965 | Hight et al. | 138/97 |
| 3,261,374 | 7/1966 | Anderson et al. | 138/97 |
| 3,562,056 | 2/1971 | Olson | 264/35 |
| 3,662,045 | 5/1972 | Tierling | 264/35 |
| 3,773,874 | 11/1973 | Long | 264/35 |
| 3,774,403 | 11/1973 | Cushing | 61/72.7 |
| 3,816,148 | 6/1974 | Barthel | 106/107 |

Primary Examiner—Richard E. Aegerter
Assistant Examiner—Frederick R. Schmidt
Attorney, Agent, or Firm—Fulbright & Jaworski

[57] ABSTRACT

A sewer pipe is repaired by inserting a thin, flexible liner within the sewer pipe. The liner has an outer diameter less than the inner diameter of the sewer pipe, whereby an annular space is presented between the liner and the sewer pipe. This annular space is filled with a low viscosity magnesium based cement, such as magnesium oxychloride cement or magnesium oxysulfate cement, which has a maximum Marsh funnel viscosity of 40 seconds per quart.

4 Claims, 2 Drawing Figures

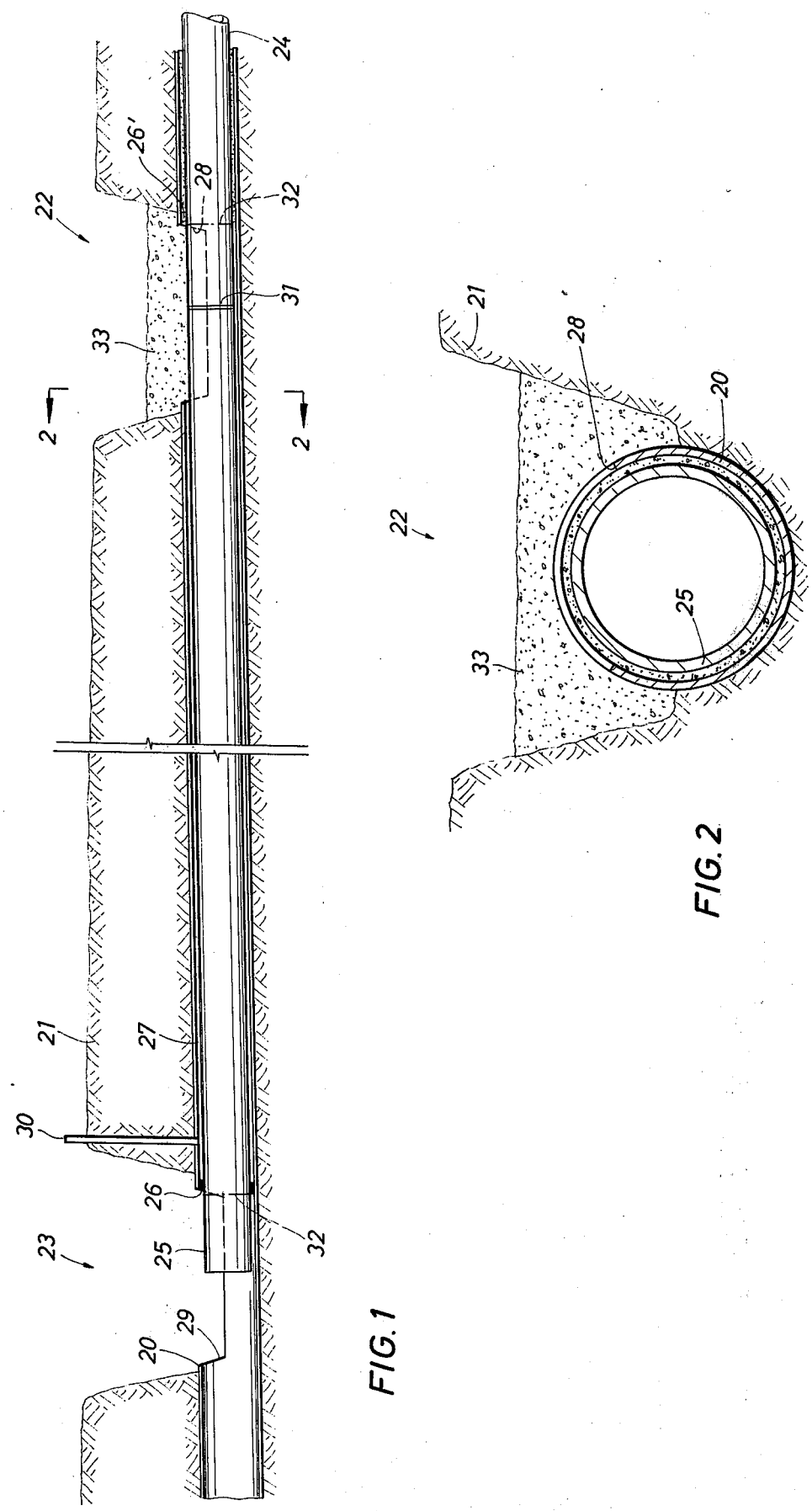

METHOD FOR REPAIRING SEWER PIPES

BACKGROUND OF THE INVENTION

1. Field of the Invention

The invention relates to a method for repairing sewer pipes, wherein a liner is cemented to the interior of the existing sewer pipe.

2. Description of the Prior Art

Repairing sewer pipes which have developed leaks has proven to be an expensive operation, normally involving disruption of sewer service. One of the most common solutions has been to dig up the section of leaking sewer pipe and then replace it with new pipe which is suitably attached to the existing sewer pipe. The expense of this method is readily apparent, as is the disruption of sewer service.

U.S. Pat. No. 3,834,422, issued to Richard E. Larson, on Sept. 10, 1974, discloses an apparatus for internally repairing leaks in concrete sewer pipes which uses an expandable grouting sleeve and associated apparatus which are all located within the interior of the sewer pipe to be repaired. This apparatus is representative of the many available devices for internally repairing sewer pipe leaks. In addition to the complexity of devices of this type, including the expense of manufacturing and operating these devices, another disadvantage in using these apparatus is that the entire sewer pipe is blocked, whereby sewer service is disrupted while these apparatus repair the leaks in the sewer pipe. A further disadvantage of these devices is that repairs may be affected in only a relatively small localized region of the sewer pipe. Many localities have in the past used large diameter steel sewer pipes which have become corroded, whereby these steel sewer pipes have developed leaks throughout major portions of the length of the sewer pipe. Thus, the use of such devices as disclosed in U.S. Pat. No. 3,834,422 is not feasible to repair these corroded steel sewer pipes.

Many examples of apparatus for forming a sewer pipeline in situ are to be found in the prior art; e.g., U.S. Pat. No. 3,205,550 issued to Floyd E. Martin on Sept. 14, 1965, and U.S. Pat. No. 3,551,537 issued to Larry V. Thomason on Dec. 29, 1970. These apparatus are utilized when the existing, leaking sewer pipe is dug out of the ground, and rather than place new sections of sewer pipe in the ground, these apparatus are used to form a continuous section of new sewer pipe. The major disadvantage in using these apparatus to repair sewer pipes is that, in addition to the great expense involved in digging up the existing sewer pipeline, there is a complete disruption of sewer line service.

U.S. Pat. No. Re. 27,144 issued to Rubenstein, is an example of a technique for the manufacture of a reinforced composite concrete pipeline in situ. A reinforced pipe formed at the site of the pipeline is placed in a trench and a concrete is deposited around the pipe while air pressure is maintained within the pipe. Numerous different cement compositions are disclosed as being suitable substituent materials for the concrete which is deposited around the pipe, including oxysulfate and oxychloride cements. Again, the major disadvantage in using this apparatus is that the old sewer line must be completely dug up with the attendant expense and disruption of sewer line service resulting from the use of this apparatus.

Recently, it has been suggested to insert a plastic liner within an existing, but leaking, sewer pipe and attaching this liner to the existing sewer pipe by filling with concrete the space between the liner and the sewer pipe. This method is particularly suitable for repairing corroded steel sewer pipes and cracked fiberglass sewer pipes. However, many problems have been found to exist in attempting to use such a method. In order to facilitate the insertion of the plastic liner into the existing sewer pipe, it has been necessary to use a plastic liner having a small wall thickness, such that the liner has a high degree of flexibility and elasticity. The thin-walled nature of the plastic liner being used also has the additional advantage that it is more economical to manufacture. However, the major problem which precludes using this method in repairing sewer pipelines is directly attributable to the necessity of using such a flexible liner. The preferred liner cannot withstand a pressure substantially in excess of five pounds per square inch of surface area or, if that pressure limit is exceeded, the plastic liner will collapse, thereby obstructing the sewer pipe.

The space between the liner and the existing sewer pipe must be filled with cement in order to prevent the existing sewer pipe from developing further leaks and to protect the liner from being damaged. For example, leaking fiberglass sewer pipes usually experience collapsing at the topmost portion of the sewer pipe due to point-loading on that portion of the sewer pipe caused by the earth overlaying the sewer pipe. This point-load collapsing could continue once a liner has been inserted into the sewer pipe if the space between the liner and the sewer pipe is not filled with cement, whereby ground water and the earth above the sewer pipe could flow into the space between the liner and the sewer pipe. This potential erosion problem not only could cause the earth located above the sewer pipe to be subject to collapsing, but the ground water and earth flowing into the space would eventually flow to a sewage treatment plant located at the end of the sewer pipeline. This undesired ground water and earth may cause the sewage treatment plant capacity to be exceeded, whereby the dumping of untreated sewage into a river, lake, or stream might be necessitated. Additionally, if the space between the liner and the sewer pipe is not filled with cement, the ground water and earth could flow into that space and puncture, or otherwise damage, the thin-walled liner, whereby the undesired ground water and earth could enter the sewer pipeline system.

The use of conventional cements to fill the space between the liner and the existing sewer pipe presented numerous problems when attempting to cement the plastic liner to the existing sewer pipeline. The conventional cements would either shrink or swell upon curing, thereby leaving voids between the liner and the sewer pipeline or exerting excessive pressure upon the liner resulting in its collapsing or rupturing. Some conventional cements experience an exothermic reaction upon curing, whereby the excessive amounts of heat given off by these reactions damaged the plastic liner. Other cements require large amounts of pressure to pump the cement mixture into the space between the liner and sewer pipe, whereby the liner ruptured under the excessive amount of pressure.

Another major disadvantage of this method is that the existing sewer pipeline must be cleaned of the refuse and debris contained in the bottom of the sewer pipeline. This cleaning step is necessitated by the fact that conventional cements would not cure properly if the refuse found in the sewer pipeline was mixed with the cement being pumped about the liner. Additionally, sewer line service had to be disrupted while cement was being pumped into the space between the liner and the pipeline, so as to avoid the mixing of the sewer pipe refuse and the cement.

Accordingly, prior to the development of the present invention, there has been no method or apparatus available for efficiently and economically repairing a leaking sewer pipeline which does not have the problems previously described. Therefore, the art has sought an efficient and economic method for repairing sewer pipelines absent the problems of previously proposed sewer pipeline repairing methods.

SUMMARY OF THE INVENTION

In accordance with the invention, the foregoing has been achieved through the present method for repairing sewer pipe. With the method of the present invention, a flexible liner is inserted within a sewer pipe having an upstream portion and a downsteam portion. The liner has an outer diameter which is less than the inner diameter of the sewer pipe. The liner is then supported in a spaced relationship from the sewer pipe, whereby an annular space is formed between the liner and the sewer pipe. The annular space is then filled with a low viscosity magnesium based cement from the group consisting of magnesium oxychloride cement and magnesium oxysulfate cement. The cement has a maximum Marsh funnel viscosity of 40 seconds per quart.

As indicated above, in more specific terms, the method of the present invention uses a flexible liner made of polyethylene. This flexible liner cannot withstand a pressure substantially in excess of five pounds per square inch of surface area.

A feature of the present invention is that the annular space is filled by digging a hole about the sewer pipe at its upstream portion, and this hole is filled with cement to a sufficient height to form a hydrostatic head. The hydrostatic head will cause the cement to flow into the annular space, thereby filling the annular space as the cement flows downwardly to the downstream portion of the sewer pipe.

Another feature of the present invention resides in the fact that the flexible liner is supported in a spaced relationship from the sewer pipe by packing material which is disposed about the flexible liner at the downstream portion of the sewer pipe.

The method of the present invention when compared with previously proposed prior art methods has the advantages of efficiency, economy, elimination in substantial part of any interruption of the flow of sewage in the sewer pipe to be repaired, and the elimination of cleaning a sewer pipe prior to repairing it. Additionally, the expense of digging up the entire sewer pipe in order to replace or repair it has been eliminated.

BRIEF DESCRIPTION OF THE DRAWINGS

In the drawings:

FIG. 1 is an elevational view, partially in section, showing a sewer pipeline with a liner inserted therein;

FIG. 2 is a sectional view taken along line 2—2 of FIG. 1.

While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown an existing sewer pipeline 20 which is to be repaired according to the method of the present invention, whereby the advantages previously described are achieved. Sewer pipe 20 may be a large diameter steel pipe which has become corroded. Alternatively, pipe 20 may be made of fiberglass, clay tile, or concrete, consisting of a plurality of joined pipe sections or a single continuous section of pipe. Although sewer pipe 20 is shown to be of circular cross section, it is readily apparent that the method of the instant invention may be utilized to repair a sewer pipeline having any shaped cross section; e.g., a sewer pipe having a rectangular cross section. It is also readily apparent that the method of the present invention could also be used to repair other types of substantially horizontal pipelines, other than sewer pipelines; e.g., pipelines used to convey water, natural gas, crude oil, etc. Sewer pipe 20 is disposed in the ground 21 in a substantially horizontal position; however, a slight slope of about one or two inches per thousand feet of pipe 20 is provided, such that sewer pipe 20 has an upstream portion 22 and a downstream portion 23. As shown in FIG. 1, sewer pipe 20 slopes downwardly from the upstream portion 22 to the downstream portion 23. This slight slope is provided such that refuse will readily flow down the sewer pipe 20 toward its ultimate destination.

Disposed within sewer pipeline 20 are two sections of a flexible liner 24 and 25, as shown in FIG. 1. Liner 25 has an outer diameter which is smaller than the inner diameter of pipeline 20. Although any suitable material which has the requisite flexibility, durability, and corrosion resistant characteristics may be used for manufacturing the flexible liner 25, a flexible thermoplastic material, such as polyethylene, is preferred. Liner 25 has a relatively thin-walled construction such that the liner 25 cannot withstand pressures placed upon it much in excess of five pounds per square inch, although this pressure will be dependent upon the diameter of liner 25. A large diameter thin-walled liner 25 will require less pressure to collapse it, than a small diameter thin-walled liner 25. Such a thin-walled liner 25 is preferred due to its attendant lower manufacturing cost and the ease with which it may be handled by workmen at the sewer pipeline repair site. Additionally, the preferred flexible thermoplastic liner 25 has the additional advantage in that the sections of the liner 24 and 25 may be thermoplastically "welded" together in any suitable conventional manner by applying heat to the edges of the sections of the liner 24 and 25 to be joined, as hereinafter described.

Referring to FIG. 1, it is seen that a packing material 26 is disposed about liner 25 in a sealing relationship between the inner surface of sewer pipeline 20 and outer surface of liner 25, such that the packing material supports the end of the liner 25 at the downstream portion 23 of sewer pipeline 20. Thus, the liner 25 is supported in a spaced relationship from the pipeline 20 whereby an annular space 27 is formed between the liner 25 and the sewer pipeline 20. A hemp rope packing 26 grouted with a rapid setting cement grout is preferred, although any suitable conventional material may be used for packing 26; e.g., wooden blocks, a polyethylene ring, sections of heavy cardboard, any type of rubber packing material, etc.

In practicing the method of the present invention, the sewer pipeline 20 to be repaired is exposed at two locations, one at the upstream portion 22 and at the downstream portion 23 of sewer pipeline 20, by digging a hole in the ground 21 about pipeline 20, as shown in FIGS. 1 and 2. It is only necessary to dig the hole deep enough to expose approximately half of the upper portion of sewer pipe 20 as shown more clearly in FIG. 2. The sewer pipe 20 is exposed at the two locations 22 and 23 which are preferably about three hundred to five hundred feet apart, although the locations 22 and 23 may be spaced apart any desired distance. After the holes are dug at the upstream and downstream locations 22 and 23, the upper half of sewer pipe 20 is removed, as shown at openings 28 and 29 in FIG. 1, thus allowing access to the interior of sewer pipe 20.

The size of the holes made at the upstream 22 and downstream 23 portions of sewer pipe 20 are large enough to accommodate the insertion of liner 25 within the sewer pipeline 20. After the top half section of sewer pipeline 20 is removed, the flexible liner 25 is inserted at the upstream portion 22 of pipeline 20 and is pulled through the opening 28 into pipeline 20. Liner 25 is pulled through the pipeline 20 until the liner 25 extends from the upstream portion 22 to the downstream portion 23 of sewer pipe 20. After this step has been accomplished, the end of liner 25 located at the downstream portion 23 of sewer pipe 20 is supported by packing 26 in a spaced relationship from pipeline 20, whereby an annular space 27 is formed between the liner 25 and the pipeline 20. If desired, an overflow tube 30 may be inserted into the ground 21 anywhere in the general vicinity of the downstream portion 23 of sewer pipe 20, such that it extends into the pipeline 20 into contact with annular space 27. The overflow tube 30 can give an indication of when cement has filled the annular space 27 as to be hereinafter described, in addition to providing for the escape of air and some of the refuse and water found in annular space 27. It will be readily apparent that additional supporting means, such as additional packing material (not shown) could be utilized along the length of liner 25 in order to assist packing material 26 in supporting the liner in a spaced relationship from sewer pipe 20. Such additional supporting means could be provided by attaching a thin spacing member (not shown) along the lower outer circumference of liner 25, such that the additional supporting means does not interfere with the flow of cement about liner 25 as to be hereinafter described.

After liner 25 has been inserted within sewer pipe 20, liner 25 is connected to the second liner 24, which has previously been inserted in sewer pipe 20. Any suitable means for connecting the two liners 24 and 25 may be utilized; e.g., placing a collar about the exterior surfaces of liners 24 and 25 after they have been placed in an abutting relationship at location 31, gluing the two liners together, taping the two sections together, etc. However, in the preferred embodiment a simple and economical method for joining the two liners 24 and 25 together comprises the step of thermoplastically "welding" the two liners 24 and 25 the application of heat at location 31, utilizing any suitable means for applying the heat in a conventional manner.

It should, of course, be understood that were it to be only necessary to repair a section of sewer pipeline 20 extending from the upstream location 22 to the downstream location 23, the step of joining liner 25 to liner 24 would be unnecessary. In that situation, liner 25 would be inserted within sewer line 20, whereby liner 25 would then be pushed in an upstream direction to the position shown at dotted lines 32 in FIG. 1. Packing 26' would be provided at both ends of liner 25 when making this type of sewer line repair.

After liner 25 has been inserted into sewer pipeline 20 and supported in a spaced relationship from the pipeline 20 whereby an annular space is formed between the liner 25 and the pipeline 20, the annular space 27 is filled with a low viscosity magnesium based cement 33 from the group consisting of magnesium oxychloride cement and magnesium oxysulfate cement, whereby liner 25 is bonded to the sewer pipe 20. It is essential that this type of cement is utilized for filling the annular space 27 and that the cement has a maximum Marsh funnel viscosity of 40 seconds per quart. To provide a comparison, the Marsh funnel viscosity of water is 27 seconds per quart. If the Bingham model for measuring viscosity is utilized, the plastic viscosity of the cement is less than 40 centipoise and the yield point is less than 15 pounds per 100 square feet.

Preferably, the filling step is accomplished by filling the hole at the upstream portion 22 of sewer pipeline 20 with cement 33 to a sufficient height to form a hydrostatic head. Thus, the hydrostatic head will cause the cement 33 to flow into the annular space 27 and thereby filling space 27 as cement 33 flows downwardly to the downstream portion 23 of sewer pipe 20. The hole is filled to a sufficient height whereby the hydrostatic head is formed, but not enough cement 33 is poured into the hole such that liner 25 would be subject to collapsing. It should be readily apparent that other suitable means could be provided for filling annular space 27 with cement 33; e.g., a conventional pump could be utlized in lieu of filling the hole to form a hydrostatic head.

The criticality of using either a magnesium oxychloride cement or magnesium oxysulfate cement having a maximum Marsh funnel viscosity of 40 seconds per quart is necessitated by the fact that, were a cement to be used having a higher viscosity, the cement would not properly flow downstream to fill the narrow annular space 27, without exerting a force upon liner 25 greater than that which liner 25 could withstand without collapsing.

The magnesium oxychloride and magnesium oxysulfate cements which are employed in accordance with the present invention, are disclosed in U.S. Pat. Nos. 3,816,148 issued to Horst Barthel on June 11, 1974, and U.S. Pat. No. 3,887,009 issued to Geo. L. Miller and Horst K. F. Barthel on June 3, 1975. The contents of those patents are herein incorporated by reference as a disclosure of suitable magnesium oxychloride and magnesium oxysulfate cements which may be employed in accordance with the method of the present invention. These cements can readily be formed into a very fine slurry which easily fills annular space 27 and readily flows downwardly to the downstream end of liner 25.

In addition to the advantage of magnesium oxychloride and magnesium oxysulfate cements, having a maximum Marsh funnel viscosity of 40 seconds per quart not collapsing liner 25; the use of these cements provides the following advantages. These cements will readily bond to metal, clay tile, fiberglass, concrete, cement, and polyethylene, thus assuring a good bond between sewer pipeline 20 and liner 25. Additionally, these cements neither shrink nor swell in any significant amount upon curing, whereby no voids or bulges will be formed in annular space 27. If a void were to be formed at the bottom of annular space 27, it is possible that liner 25 could be damaged at that point, upon being struck by the refuse which flows through the sewer pipeline 20. Were a bulge to be formed in annular space 27 the pressure exerted by such a bulge would be likely to collapse the flexible thin-walled liner 25. Additionally, these cements do not give off excessive amounts of heat during curing, whereby heat damage to liner 25 is avoided.

Another significant advantage derived from utilizing magnesium oxychloride and magnesium oxysulfate cements is that the use of these cements allows sewer pipe 20 to be repaired without substantially interrupting the flow of refuse through sewer pipe 20. Furthermore, it is unnecessary to clean sewer pipe 20 to remove any significant amounts refuse in the sewer pipe 20. Except for the short period of time required for inserting liner 25 into the sewer pipe 20 and connecting liner 25 to liner 24, sewage can continue to flow through sewer pipeline 20. This important advantage results from the properties of magnesium oxychloride and magnesium oxysulfate cements, whereby these cements can combine with the liquid and refuse present in annular space 27 and still properly cure and set-up to form a satisfactory cement. Were ordinary portland cement to be used for filling annular space 27, not only would its much increased viscosity result in the collapsing of liner 25 because of the pressure which would be necessary to pump the portland cement into the relatively narrow annular space 27, but portland cement would not have the capability of combining with the liquid and refuse present in annular space 27 and cure and set-up to form a satisfactory cement.

From the foregoing it is seen that an efficient and economical method for repairing sewer pipelines has been provided which eliminates in substantial part, any interuption of the flow of sewage in a sewer pipeline and the necessity of cleaning a sewer pipeline prior to repairing it. Furthermore, point-load collapsing of the sewer pipeline is prevented, whereby the undesired ground water and earth located above the sewer pipeline is precluded from entering the sewer pipeline system. Additionally, the expense of digging up the entire sewer pipeline in order to replace or repair it has been eliminated.

The foregoing description of the invention has been directed in primary part to particularly preferred embodiments in accordance with the requirements of the Patent Statutes and for purposes of explanation and illustration. It would be apparent, however, to those skilled in this art that many modifications and changes in the specific method utilized may be made without departing from the scope and spirit of the invention. For example, an existing manhole could be used for either the upstream or downstream location where the sewer pipeline is exposed. It is applicant's intention in the following claims to cover such modifications and variations as fall within the true spirit and scope of the invention.

We claim:

1. In a method for repairing a substantially horizontal sewer pipe, which has an upstream portion and a downstream portion, wherein a flexible liner is inserted within the sewer pipe, said flexible liner having an outer diameter less than the inner diameter of said sewer pipe; the flexible liner is supported in a spaced relationship from the sewer pipe, whereby an annular space is formed between the flexible liner and the sewer pipe, and the annular space is filled with cement, the improvement comprising,
   (a) filling the annular space by digging a hole about the sewer pipe at the upstream portion of the sewer pipe, removing a section of the upper half of the sewer pipe, and filling the hole with cement to a sufficient height to form a hydrostatic head, whereby the hydrostatic head will cause the cement to flow into the annular space, thereby filling the annular space as the cement flows downwardly to the downstream portion of the sewer pipe,
   (b) the cement comprising a low viscosity magnesium based cement selected from the group consisting of magnesium oxychloride cement and magnesium oxysulfate cement, whereby the liner is bonded to the sewer pipe and point-load collapsing of the sewer pipe is prevented.

2. The method of claim 1 wherein an overflow tube is inserted into the annular space in the general vicinity of the downstream portion of the sewer pipe.

3. The method of claim 1 wherein the flexible liner is inserted through an opening in the sewer pipe located at the upstream portion of the sewer pipe, and the flexible liner is pulled through the sewer pipe until it extends from the upstream portion to the downstream portion of the sewer pipe, and the flexible liner is connected to a second flexible liner which has previously been inserted in another section of the sewer pipe.

4. The method of claim 3 wherein the flexible liner and the second flexible liner are connected by the application of heat.

* * * * *